United States Patent
Carter et al.

(10) Patent No.: US 9,298,839 B2
(45) Date of Patent: Mar. 29, 2016

(54) RESOLVING A DEAD SHORTENED UNIFORM RESOURCE LOCATOR

(75) Inventors: Bernadette Alexia Carter, Raleigh, NC (US); Al Chakra, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 974 days.

(21) Appl. No.: 13/483,470

(22) Filed: May 30, 2012

(65) Prior Publication Data

US 2013/0325919 A1    Dec. 5, 2013

(51) Int. Cl.
*G06F 15/16* (2006.01)
*G06F 17/30* (2006.01)

(52) U.S. Cl.
CPC ................ *G06F 17/30887* (2013.01)

(58) Field of Classification Search
CPC ....................................... G06F 17/30
USPC ........................................ 709/201
See application file for complete search history.

(56) References Cited

U.S. PATENT DOCUMENTS

| | | | |
|---|---|---|---|
| 2006/0015573 A1 | 1/2006 | Hurst-Hiller et al. | |
| 2006/0294052 A1* | 12/2006 | Kulkarni et al. | 707/1 |
| 2008/0263193 A1 | 10/2008 | Chalemin et al. | |
| 2011/0295826 A1* | 12/2011 | McLellan | 707/706 |

OTHER PUBLICATIONS

IBM, "User initiated URLs—"Show me what I mean to see"", IP.com, IPCOM000212423D, Nov. 11, 2011, IBM.

* cited by examiner

*Primary Examiner* — David Lazaro
*Assistant Examiner* — Zia Khurshid
(74) *Attorney, Agent, or Firm* — Steven L. Nichols; Fabian VanCott

(57) ABSTRACT

A method of resolving a dead shortened Uniform Resource Locator (URL) comprising, with a processor, recognizing that a shortened link is a dead link, gathering data associated with the dead link, comparing data associated with the dead link with a number of potential live links, and generating a ranked list of potential live links that have been compared with the associated data. A system for resolving a dead shortened Uniform Resource Locator (URL) posted within a status update of a social networking site, comprising, a processor and a discovery module, in which the discovery module, upon selection of a shortened URL by a user of the social networking site, recognizes that the shortened URL is a dead shortened URL, gathers data associated with the status update, and redirects the user to a live URL based on the data associated with the status update.

15 Claims, 4 Drawing Sheets

RESOLVING A DEAD SHORTENED UNIFORM RESOURCE LOCATOR

BACKGROUND

Social interact sites provide an effective way of communication. Often these social internet sites provide a user with the ability to quickly provide status updates to other subscribers of the social internet site who may be viewing or following that user's social website. Often a user may include links to websites within the text or content of the status updates. These links may direct another user to other content in the Internet which is related to the information posted by the user. The links included in the content may be shortened through the use of a Uniform Resource Locator (URL) shortening website. The shortening website may accept a relatively lengthy URL and return to the user of the website a shortened URL address which may be inserted into the content of the status update. Therefore, with social networking websites that limit the amount of space available to a user, a user may include relatively shorter URLs in his or her status update while leaving space for the user to update his or her status.

SUMMARY

According to one example of the present specification, the present specification describes a method of resolving a dead shortened Uniform Resource Locator (URL) comprising, with a processor, recognizing that a shortened link is a dead link; gathering data associated with the dead link; comparing data associated with the dead link with a number of potential live links; and generating a ranked list of potential live links that have been compared with the associated data. In another example, the method may comprise redirecting a user to a live internet site after the user has selected the dead shortened URL. The present specification further describes a system for resolving a dead shortened Uniform Resource Locator (URL) posted within a status update of a social networking site, comprising, a processor and a discovery module, in which the discovery module, upon selection of a shortened URL by a user of the social networking site, recognizes that the shortened URL is a dead shortened URL, gathers data associated with the status update, and redirects the user to a live URL based on the data associated with the status update.

BRIEF DESCRIPTION OF THE SEVERAL VIEWS OF THE DRAWINGS

The accompanying drawings illustrate various examples of the principles described herein and are a part of the specification. The illustrated examples do not limit the scope of the claims.

Throughout the drawings, identical reference numbers designate similar, but not necessarily identical, elements.

DETAILED DESCRIPTION

Figure 1:
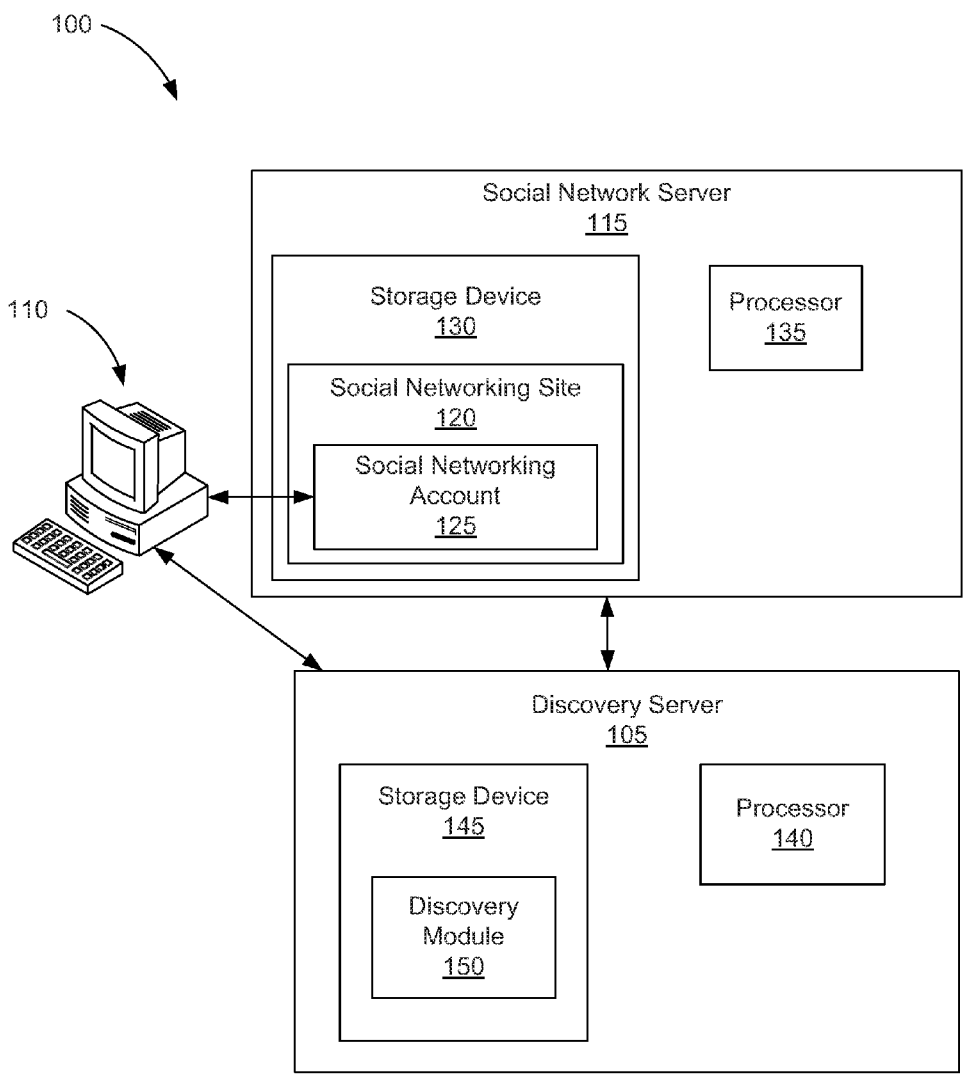
FIG. 1 is a block diagram of one example of a system for resolving dead shortened URLs, according to one example of principles described herein.

Social networking sites allow a user to update information about the user and what he or she is doing. As described above, these status updates may include additional information in the form of a Uniform Resource Locator (URL) link to other websites and content located on the Internet, an internet, or an extranet. URLs, when clicked on by a user, will direct another user to content that the user had intended to be associated with the content of the status update. However, URLs may be quite tong, containing long strings of text that define the address of the website the user wishes the link to direct other users to. These long strings of text may be so long as to prevent a user from entering it into a status update on a social network. Even when the user may be able to enter in the entire URL, the user may be limited by the content that he or she may add into the status update. This may occur because some social networking sites may limit the amount of text that can be entered into any one status update field.

When the length of the URL exceeds the allowed number of characters in a status update field, a user may reduce the number of characters used in the URL through a URL shortening service. Some examples of URL shortening services are bit.ly, tinyurl.com, goo.gl, and t.co. The URL shortening services use an HTTP redirect on a domain name that is short, which links to the web page that has the long URL. Therefore, when a user of a social networking site enters in these shortened URL links into their status update fields, viewers accessing that link may click on that link so as to direct them to the additional content the user had intended them to view. However, when the viewers click on that link they are redirected through the URL shortening website used by the user before being directed to the intended website.

An issue may arise when the URL shortening website used by the user goes down for some reason or another. When this occurs, the shortened URL within the status update wilt be broken or dead. Therefore, the present specification describes a system and method of redirecting a viewer of a status update to a live link when shortened and dead URL is selected. In one example, the system and method may redirect the view to the website the user had intended the viewer to reach via the shortened URL. In another example, the system and method may provide to a viewer a ranked list of possible websites to be redirected to if the system cannot determine which website the user had intended to redirect the viewers to.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples.

Aspects of the present specification may be embodied as a system, method or computer program product. Accordingly, aspects of the present specification may take the form of an entirely hardware embodiment, an entirely software embodiment (including firmware, resident software, micro-code, etc. or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber RF, etc., or any suitable combination of the foregoing.

Computer program code for carrying out operations for aspects of the present specification may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present specification are described below with reference to flowchart illustrations and/or block diagrams of methods, apparatus (systems) and computer program products according to embodiments of the specification. It will be understood that each block of the flowchart illustrations and/or block diagrams, and combinations of blocks in the flowchart illustrations and/or block diagrams, can be implemented by computer program instructions. These computer program instructions truly be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In the present specification and in the appended claims the term "dead link" or "broken link" is meant to be understood broadly as any link with content on the Internet which is does not direct the viewer to the intended website when selected. In one example, the dead link may be a shortened version of a more complete URL; the shortened link being obtained through the use of a shortening URL service. In other examples, these dead links may appear in social networking sites such as Twitter®, Facebook®, Google+®, Blogger®, and other sites where individual users may be allowed to interact socially with other users through the internet.

Additionally, in the present specification and in the appended claims, the term "URL shortening service" is mean to be understood broadly as any online service which receives as input a Uniform Resource Locator (URL) and returns as output a shortened version of the URL capable of directing a viewer to the website described by the original, relatively lengthier URL.

Still further, in the present specification and in the appended claims, the term "live link" is meant to be understood broadly as any that, if a user selects that link, he or she will be directed to a website that is still available via the internet, an intranet or an extranet.

FIG. 1 is a block diagram of one example of a system (100) for resolving dead shortened URLs, according to one example of principles described herein. The system (100) may include a discovery server (105) communicatively coupled to a user's computing device (110) and a social networking server (115). The discovery server (105), user computing device (110), and social networking server (115) may be communicatively coupled via a wireless or wired connection and may further allow data to be transferred to and from each device. Although the system (100) shows a single user computing device (110), other examples may include a number of computing devices (110) communicatively coupled to the social networking server (115) and server (105). Further, although the social networking server (115) and discovery server (105) appear in the system (100) as single servers respectively the various components and computer usable programming may be included on a number of servers and computer storage devices in combination.

The user computing device (110) may be any type of computing device. Some examples may include a desktop computer, a laptop computer, a personal digital assistant (PDA), a smartphone, or any other type of computing device. The user computing device (110) may further include a network adapter for connecting the user computing device (110) to the discovery server (105) and social networking server (115).

The user computing device (110) may include a graphical user interface through which the user may access his or her social, networking account (125) associated with a social networking site (120). Through the user's computing device (110), the user may update his or her personal information including status updates. As discussed above, the user may update his or her status by including in the status update a URL to which the user wishes another user or view of the user's status update to select and access that information associated with that URL.

The social networking server (115) may provide to a number of users social networking service through the use of the social networking site (120). The social networking site (120) is a website provided to users to update personal accounts with information they wish those persons who they are affiliated with to view. A social networking account (125) will then be set up by each user with an accompanying user name and password to allow the user to gain access to his or her account via the network connection. The computer readable code defining the website may be stored on a storage device (130) within the social network server (115). In order to provide access to the social networking site (120), the social networking server (115) may execute that code on a processor (135) associated with the social networking server (115). Content may be provided by a user of the social networking site (120) via the user computing device (110) in the form of various posts and status updates associated with that user. As will be described in more detail taker, these status updates may include shortened URL links within the content provided by the users.

The discovery server (105) comprises a processor (140), a storage device (145) and a discovery module (150). The discover module is comprised of computer program code which, when executed by the processor (140) may receive a request from either the user computing device (110) or social networking server (115) to discover potential live links that will direct a viewer of the status update to the appropriate website despite having selected shortened dead link supplied within the content of the status update. As will be discussed in more detail later, the discovery module (150) may, when executed by the processor (140), generate data descriptive of users associated with the dead link; generate data descriptive of tags and keywords associated with dead link; generate data descriptive of sources that is used to find original link of dead link; and, generate data descriptive of links that are tagged with content. With this data, the discovery server (105) and discovery module (150) may provide the viewer of the status update with at least a ranked list of potential live links to which the user may be directed to in order to view the content the user who has posted the status update intended the viewer to see. In one example, the social network server (115) may address the discovery server (105) to help the viewer of the selected URL receive the ranked list of potential live links to which the user may be directed. In another example, the user of the user computing device (110) viewing the status update and who has selected the dead link may address the discovery server (105) for the ranked list of potential live links to which the user may be directed.

The storage device (145) may be similar to the storage device (130) of the social networking server (115). Some examples of storage devices (130, 145) may be a memristive device, a hard disk drive (HDD), a random-access memory (RAM) device, a read-only memory (ROM) device, a flash memory device, and any other volatile or non-volatile memory devices. Both storage devices (130, 145) may serve to store, at least temporarily, computer program code for later reference and use by their respective processors (135, 140).

Although FIG. 1 shows that the computer program code that defines the discovery module (150) is stored and implemented via the discovery server (105), alternative examples exist. In one example, the discovery module (150) may be implemented on the social networking site (120) and offered as an add-on feature. In this example, when a dead link is selected by a viewer of the user's status update, the processor (135) of the social networking server (115) may either automatically direct the viewer to the correct website, or provide the viewer with the ranked list mentioned above. Other examples exist where the discovery module (150) forms part of another module used and accessed by the user of the social networking site (120) or viewer of a status update. Still further, in one example, the discovery module (150) may be implemented on the viewer's computing device and may be stored thereon. In this example, the user, upon selecting a dead shortened URL on a user's status update, may be prompted to enter in the shortened URL in a pop-up window provided via the execution of the computer program code defining the discovery module (150). Of all these examples, the computer program code defining the discovery module (150) may allow a viewer to be directed to the website the dead shortened URL had initially been set up to direct the viewer to. If the discovery module (150) is incapable of directing the viewer to the original website, the discovery module (150) may provide the viewer with a ranked list of websites. These website may provide alternatives to the original website; the alternative websites provide to the viewer similar content as that of the original website.

Figure 2:
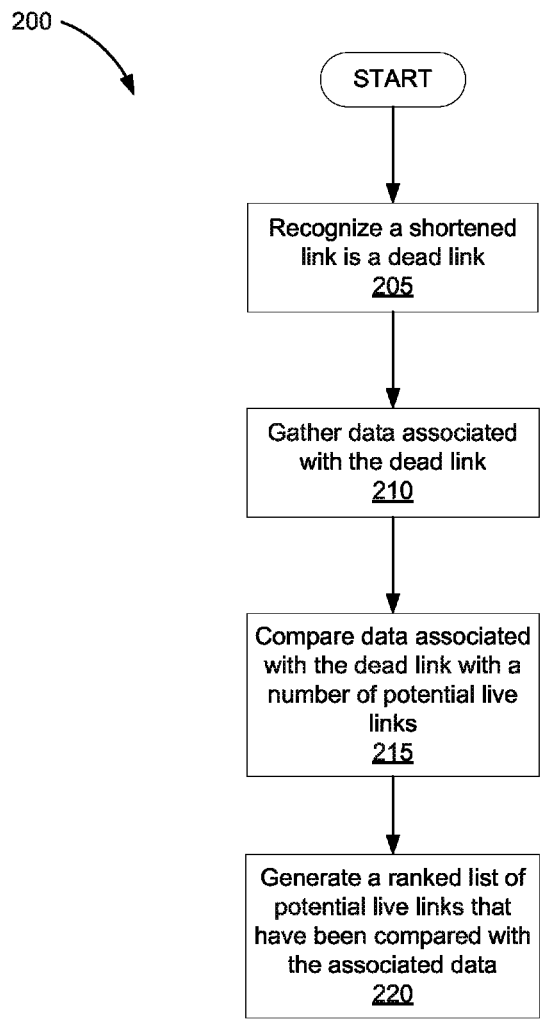
FIG. 2 is a flowchart showing a method of resolving a dead shortened Uniform Resource Locator (URL) according to one example of principles described herein.

FIG. 2 is a flowchart showing a method (200) of resolving a dead shortened Uniform Resource Locator (URL) according to one example of principles described herein. The method (200) may begin with the system (100) recognizing (205) that there is a dead link within a status update. As described above, a shortened URL may become dead when, for example, the website of the URL shortening service used to shorten the URL has gone down. Recognition (205) that the shortened URL is dead may be done by the social network server (115) or the discovery server (105). In one example, when a viewer of a user's status update clicks on the link, the social network server (115) may attempt to direct the viewer to the appropriate website using the URL. If the link is a live link, the social network server (115) will redirect the user to the appropriate website through the viewer's web browser.

However, when the social networking server (115) attempts to direct the viewer to the appropriate website and finds that the link is a dead link, the social networking server (115) will use the discovery server (105) to gather (210) data and metadata associated with the dead link. One example of the data that may be gathered may be a list of people associated with the status update itself. For example, the names of the persons referenced in the status update as well as those persons' social network connections may all be used to determine, at least partially, the potential topic of the shortened URL in the status update. For example, a person referenced in the status update may be a famous person who was in the news recently. This data, along with the timestamp of the status update, may provide additional data when looking for the corresponding live link.

Other data that may be gathered (210) may include tags and other keywords provided within the content of the status update. For example, some users may enter into the content of their status updates keywords proceeded by a "#" mark. This may be done so as to have that status update included within the search results of a viewer if that viewer was looking for status updates around that topic. These keywords and tags may also be compared against the timestamp of the status update to provide additional data about the potential topic of the live URL as well as the likelihood that a found live URL corresponds with the dead shortened URL or is at least similar in topic.

Even further, data descriptive of a number of potential sources of the real or alternative URLs could be gathered (210). The sources may include the internet browsing history of not only the user who posted the status update but also those users who posted status updates around that time. The browsing history of the original user who posted the status update containing the dead link may be used to potentially find the exact live link of which the dead shortened ink was meant to refer to. Often the user's computing device (110) keeps track of which interact sites the user has accessed within a predetermined length of time. The user in this example may have accessed the very website he or she intended to refer to others via the shortened URL in the status update. If no browsing history is found on the computing device (110) of the user who posted the status update, other users' browser history may also provide additional data to find similar links containing content similar to the topic of the dead shortened URL. In some examples, the other users' browsing history may provide the exact intended link. Still further, other users' browsing history may include the link if one of the other users had accessed the shortened URL before it became a dead URL. In this example, the social network server (115) may simply redirect the viewer of the status update to the correct site automatically without the viewer's input.

Still further, social bookmarks, content created in the status update, and status updates created some time around the time of the posting of the status update may also be used to gather (210) additional data. Specifically, the user's own bookmarks from a social bookmarking website may lead to additional data about the dead shortened URL. The system (100) may crawl through the list of bookmarks on the user's social bookmarking website and find bookmarks with similar content. The time that these bookmarks were created may also be used to identify the URL or URLs similar to the dead shortened URL. Similar to above, other users' social bookmarking may be used as well to provide similar data.

Even further, status updates posted to the social networking site (120) by other users of the social networking site (120) may be used to gather (210) data about the dead shortened URL. As current events are provided, these users may post similar status updates based on those current events.

In yet other examples, the system (100) may look to social networking action history of each user. Social networking action history may include, for example, data or metadata describing groups that were joined by each user, videos viewed by each user as well as other actions completed on a social networking site.

After the system (100) has gathered (210) all of the above described data, that data associated with the dead shortened URL may be compared (215) with a number of potential live links (215). As briefly discussed above, the data gathered (210) may have been sufficient to find the exact website to which the user had intended to direct his or her viewers to using the shortened URL. In this case, the system (100) may automatically direct a viewer who clicked on the dead shortened URL to that website without intervention by the viewer. However, when the exact URL is not discovered, or the data gathered (210) is not sufficient to determine the true intended website, the system (100), after comparing (215) that data to a number of potential live links, may generate (220) a ranked list of potential live links. In one example, this list may include a link to a website that was the exact website a viewer would have been redirected to if the dead shortened URL on the user's status update had worked. In another example, the list may include links similar to that intended website. In one example, the list may be provided to the viewer of the user's status update in a pop-up window on a graphical user interface of a computing device. In this example, the viewer may be allowed to click on any number of links provided in the ranked list.

The ranked list that is generated (210) may rank the number of links provided by the system (100) by taking into consideration both the type of data or metadata gathered (210) and also the number of times a keyword or tag is found in connection with any one specific link in the ranked list. For example, any one link within the list of links may be ranked higher if it was viewed around the time the user had posted his or her status update. Additionally, any one link within the list of links may be ranked higher if the link has more keywords or tags in common with the dead shortened URL. Further, any one link within the list of links may be ranked higher if the link has a stronger relationship with the content of the status update or the person who posted the content.

In the above examples, the dead shortened URL may have become a dead URL after the website or webpage was deleted. In this case, a similar result may be carried out. Instead of the possibility that the live URL can be found, the system (100) proceeds with generating (220) a ranked list of other links that may provide the same or similar information as the now dead shortened URL used to provide. In this way, any number of possible websites may be provided to a viewer of a user's status update even if the content no longer exists on the specific website. One example of this is news articles. News articles found on the internet could be replaced relatively quickly as current events change throughout the day. Any one article may be archived or even removed completely from the news website. The system (100) may provide alternative websites, i.e. other news websites that have similar content as the original website had. Therefore, a link in a status update by a user may still be relevant despite a change of the information found through the internet using the above described system (100).

Figure 3:
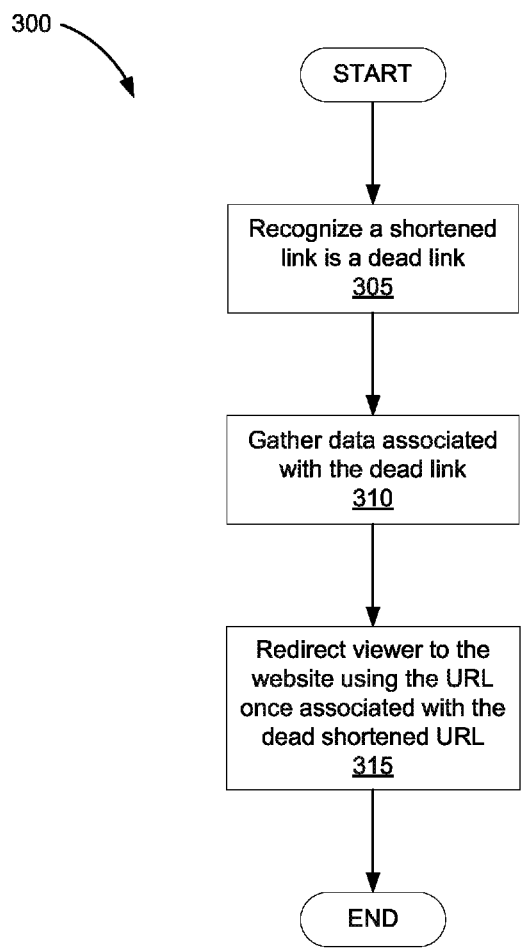
FIG. 3 is a flowchart showing a method of resolving a dead shortened Uniform Resource Locator (URL) according to another example of principles described herein.

FIG. 3 is a flowchart showing a method (300) of resolving a dead shortened Uniform Resource Locator (URL) according to another example of principles described herein. As briefly discussed above, the discovery server (105) or more particularly the discovery module (150) may find the original URL to which the dead shortened URL was to be associated with. Similar to FIG. 2, the method (300) may begin with the system (100) recognizing (305) that there is a dead link within a status update. When a viewer of the status update clicks on or otherwise selects the URL within the status update, the system (100) may recognize that the link is a dead link and execute a discovery module (150). With the discovery module (150), data associated with the dead link may be gathered (310). As discussed above, the data may be data associated with the status update itself such as the content of the status update, the timestamp of the status update, any persons named in the status update, any member's of that person's network, or any members of the user's network. Additionally, a user' browsing history and social bookmarks as well as any user's browsing history and social bookmarks may also be gathered (310). Still further, the data gathered may consist of metadata associated with the above described data. In the example of FIG. 3, the data and metadata found may provide enough information to the discovery module (150) such that the URL associated with the dead shortened URL will be discovered. That is, the URL to which the now dead shortened URL was supposed to direct the viewer to may be discovered after analyzing the gathered (310) data. Because this link has been rediscovered, the system (100) may redirect (315) the viewer to the website using the URL once associated with the dead shortened URL.

Many forms of data may exist that may direct the viewer directly to the appropriate website to which the now dead shortened URL was supposed to direct the viewer. In one example, the discovery module's (150) use of the browsing history of the various users of the social networking site (120) may provide the appropriate URL. Indeed, if the user who posted the status update had used a shortening URL service, he or she may have already visited the website to which the dead shortened URL was supposed to direct the viewer. In this case, the discovery module (150) may search for this information in the user's browser history, find the appropriate link, and redirect (315) the viewer to the website.

In another example, other status updates posted on the social networking site (120) may provide the original URL. In this example, the discovery module (150) may look at other status updates from other users of the social network site (120) posted at or around the same time as the status update containing the dead shortened URL. In some instances, shortened URLs may be reposted by a number of users of the social networking site (120). A chain of reposts may therefore be formed. In this example, the chain of reposts may be searched by the discovery module (150) and the original status update may be found. The user who posted the original status update may have included in the status update the entire URL; that is a URL that was not shortened using a URL shortening service. If the is the case, the discovery module (150) may redirect the viewer to that URL. Other examples may exist where the system (100) gathers (310) the appropriate data sufficient to direct the user to the original website.

The system (100) may provide every user with the ability to choose what data is to be shared with other users. In one example, the system (100) may provide the users with the ability to share recent browsing history with the system (100). As discussed above, sharing recent browser history may provide additional data to determine what URL the dead shortened URL was intended to redirect other users of the system (100) or viewers of the status update. In another example, the system (100) may provide each user with the ability to restrict or allow access to each user's social websites including access or denial to the names of the persons included in the users' network of followers. In yet another example, the system (100) may provide each user with the ability to restrict or allow access to social networking action history. Social networking action history may include, for example, data or metadata describing groups that were joined by each user, videos viewed by each user as well as other actions completed on a social networking site.

Additional access and denial rights may be determined by each user through the system (100) thereby allowing or disallowing the discovery module (150) to gather (310) the data associated with the dead link. Indeed, the more access a single user gives to that user's social networking sites and browsing history, for example, the better the system (100) may provide other user's of the system (100) with the URL or similar URLs as the dead shortened URL in the status update as described above.

Figure 4:
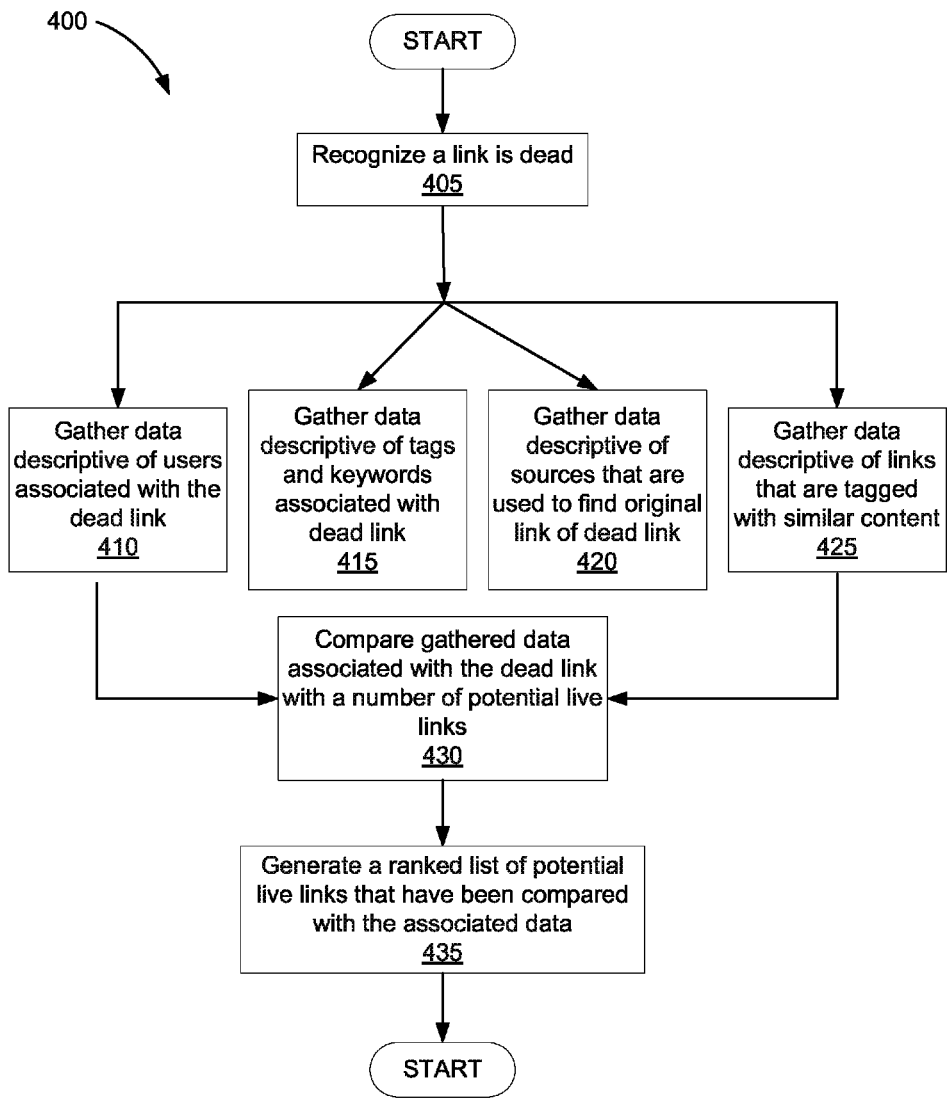
FIG. 4 is a flowchart showing a method of resolving a dead shortened Uniform Resource Locator (URL) according to yet another example of principles described herein.

FIG. 4 is a flowchart showing a method (400) of resolving a dead shortened Uniform Resource Locator (URL) according to yet another example of principles described herein. The method (400) may begin with the system (100) recognizing (405) that there is a dead link within a status update. After the system (100) has recognized (405) that there is a dead link within a status update, the system may gather (410) data descriptive of users associated with the dead link; gather (415) data descriptive of tags and keywords associated with dead link; gather (420) data descriptive of sources that is used to find original link of dead link; and gather (425) data descriptive of links that are tagged with similar content. In one example, blocks 410-425 may be completed at the same time. In other examples, blocks 410-425 may be completed in any order.

After the above described data has been gathered (410-425), the system may compare (430) the gathered data associated with the dead link with a number of potential live links. The system may then generate (435) a ranked list of potential live links that have been compared with the associated data. As mentioned above, the ranked list that is generated (435) may rank the number of links provided by the system (100) by taking into consideration both the type of data or metadata gathered (410-425) and also the number of times a keyword or tag is found in connection with any one specific link in the ranked list. For example, any one link within the list of links may be ranked higher if it was viewed around the time the user had posted his or her status update. Additionally, any one link within the list of links may be ranked higher if the link has more keywords or tags in common with the dead shortened URL. Further, any one link within the list of links may be ranked higher if the link has a stronger relationship with the content of the status update or the person who posted the content.

As discussed above the present system and method may be implemented on a computer program product. Therefore, the present specification describes a computer program product for resolving a dead shortened Uniform Resource Locator (URL). The computer program product may comprise, a computer readable storage medium having computer usable program code embodied therewith, the computer usable program code comprising, computer usable program code to, when executed by a processor, recognize that a shortened URL within a status update of a social networking site is a dead link; computer usable program code to, when executed by a processor, gather data associated with the dead link; computer usable program code to, when executed by a processor, compare data associated with the dead link with a number of live links having similar content; and generating a ranked list of potential live links that have been compared with the associated data.

The flowchart and block diagrams in the Figures illustrate the architecture, functionality, and operation of possible implementations of systems, methods and computer program products according to various embodiments of the present specification. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The specification and figures describe a system and method of resolving a dead shortened Uniform Resource Locator (URL). The system and method may provide a user of a social networking site with the ability to access information tied to a shortened URL even if the shortened URL is dead at the time the user selects it. If the system cannot find the exact URL to which the dead shortened URL was to direct the user to, it will present the user with a ranked list of potential links that the user can select and be redirected to. The ranked list may be ranked based on data and metadata associated with the status update and gathered by the system.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of resolving a dead shortened Uniform Resource Locator (URL) comprising,
    with a processor of a social networking server:
        recognizing that a shortened link within a social media post is a dead link;
        gathering data associated with the dead link comprising gathering data descriptive of sources that are used to find an original link corresponding to the dead shortened link;
        comparing data associated with the dead link with a number of potential live links;
        generating a ranked list of potential live links that have been compared with the data associated with the dead link including gathering data descriptive of tags and keywords associated with the dead link; and
        redirecting a user to a live link based on the ranked list after a user has selected the dead link.

2. The method of claim 1, in which gathering data associated with the dead link further comprises gathering data descriptive of persons associated with the dead link.

3. The method of claim 2, in which the persons associated with the dead link comprises users of a number of social network sites.

4. The method of claim 1, in which the tags and keywords are included in text within the post posted to the Internet, in which the post may be included in a status update in a social networking site, text posted to a blog, text within an email, or text posted to a forum.

5. The method of claim 1, in which the sources that are used to find the original link of the dead shortened link comprise browsing history of any user, social bookmarking sites, other content posted to the internet at a predetermined time interval before and after the posting of the dead shortened link, groups joined by any user within a social networking site, videos viewed within a social networking site by any user, and combinations thereof.

6. The method of claim 1, in which gathering data associated with the dead link further comprises gathering data descriptive of content posted to the internet containing tags indicative of similar content as the dead shortened link.

7. The method of claim 1, in which the generated ranked list is presented via a graphical user interface of a computing device for a user to select among the list of potential live links.

8. The method of claim 1, in which recognizing that a shortened link within a social medial post is a dead link comprises accessing the shortened link and receiving a response from a shortening URL service that the shortened link is a dead link.

9. A method of resolving a dead shortened Uniformed Resource Locator (URL) posted to a status update on a social networking site, comprising:
    with a processor of a social networking server;
        recognizing that the shortened URL defined within the status update on the social networking site is a dead shortened URL;
        gathering data associated with the status update, the data comprising a list of people associated with the status update and a timestamp of the status update;
        comparing the list of people associated with the status update and the timestamp of the status update with news data associated with those people; and
        redirecting a user to a live URL based on the gathered data after a user has selected the dead URL.

10. The method of claim 9, in which the persons associated with the status update comprise users of the social network who are part of a network formed by the poster of the status update.

11. The method of claim 9, in which gathering data associated with the status update further comprises gathering data descriptive of tags and keywords found within and associated with the status update.

12. The method of claim 9, in which gathering data associated with the status update further comprises gathering data descriptive of sources that are used to find the original link of the dead shortened URL.

13. The method of claim 12, in which the sources that are used to find the original link of the dead shortened URL comprise browsing history of a user, social bookmarking sites, other content posted to the internet at a predetermined time interval before and after the posting of the dead shortened URL, and combinations thereof.

14. The method of claim 9, in which gathering data associated with the status update further comprises gathering data descriptive of content posted to the social networking site containing tags indicative of similar content as the content associated with the dead shortened URL.

15. The method of claim 9, in which redirecting a user to a live URL based on the gathered data further comprises presenting a ranked list via a graphical user interface of a computing device to a user, in which the user selects among the list of potential live links.

* * * * *